United States Patent [19]

Kruse

[11] Patent Number: 5,104,448
[45] Date of Patent: Apr. 14, 1992

[54] JET PRINTING INK COMPOSITIONS AND METHODS

[75] Inventor: Jürgen M. Kruse, Branford, Conn.

[73] Assignee: XAAR Limited, Cambridge, England

[21] Appl. No.: 545,101

[22] Filed: Jun. 27, 1990

Related U.S. Application Data

[63] Continuation of Ser. No. 231,598, Aug. 9, 1988, abandoned, which is a continuation of Ser. No. 839,895, Mar. 14, 1986, abandoned.

[51] Int. Cl.$^5$ .............................................. C09D 11/12
[52] U.S. Cl. ....................................... 106/22; 106/23; 346/1.1
[58] Field of Search ............................ 106/20, 22, 23; 346/1.1

[56] References Cited

U.S. PATENT DOCUMENTS

| | | | |
|---|---|---|---|
| 2,543,727 | 2/1951 | Lecture et al. | 106/27 |
| 2,684,909 | 7/1954 | Leekley et al. | 106/24 |
| 3,393,167 | 7/1968 | Varron et al. | 260/28.5 |
| 3,472,802 | 10/1969 | Bownes et al. | 260/13 |
| 3,687,887 | 8/1972 | Zabiak | 524/96 |
| 3,903,034 | 9/1975 | Zabiak et al. | 524/247 |
| 4,021,252 | 5/1977 | Banczak et al. | 106/30 |
| 4,162,164 | 7/1979 | Lin | 106/21 |
| 4,171,982 | 10/1979 | Lin | 106/22 |
| 4,177,075 | 12/1979 | Mansukhani | 106/30 |
| 4,195,104 | 3/1980 | Fell | 427/261 |
| 4,279,653 | 7/1981 | Makishima et al. | 106/22 |
| 4,685,968 | 8/1987 | Palmer | 106/23 |
| 4,810,292 | 3/1989 | Palmer et al. | 106/23 |

FOREIGN PATENT DOCUMENTS

| | | |
|---|---|---|
| 8654975 | 6/1977 | Australia . |
| 1194076 | 9/1977 | Australia . |
| 1563676 | 12/1978 | Australia . |
| 2602677 | 12/1978 | Australia . |
| 59-64678 | 4/1984 | Japan . |

OTHER PUBLICATIONS

Derwent Abstracts Accession No. 79-08972B/05, Japanese Pat. No. J53145711, 12/19/78.
Derwent Abstract Accession No. 84-130202/21, Japanese Pat. No. J59064678, 4/12/84.

Primary Examiner—Amelia Burges Yarbrough
Attorney, Agent, or Firm—Marshall, O'Toole, Gerstein, Murray & Bicknell

[57] ABSTRACT

Jet printing ink compositions characterized as having low volatility, low viscosity and low variation of viscosity with respect to temperature are disclosed. The compositions comprise a coloring agent dissolved or dispersed in a liquid vehicle which is preferably substantially free of added water and is a propylene glycol ether or an ethylene glycol butyl ether in which the coloring agent is soluble or dispersible.

53 Claims, No Drawings

JET PRINTING INK COMPOSITIONS AND METHODS

CROSS-REFERENCE TO RELATED APPLICATIONS

This is a continuation of copending, commonly assigned application Ser. No. 07/231,598 filed Aug. 9, 1988, now abandoned, which is a continuation of application Ser. No. 06/839,895 filed Mar. 14, 1986, now abandoned.

BACKGROUND OF THE INVENTION

1. Field of the Invention

This invention relates generally to ink compositions and, more particularly, this invention relates to ink compositions useful in jet printing applications, especially "drop on demand" jet printing applications.

2. Description of Related Art

Printing according to the "ink jet printing" principle, and apparatus for carrying out such printing operations, are well known in the art. In general terms, a fluid ink is forced, under pressure, through a very small orifice in a printing head.

In so called "continuous" jet printing operations, the droplets are passed through a charging area wherein individual droplets receive an electrical charge in response to a signal. The droplets then pass through an electrical field, causing a varied deflection of the individual droplets dependent on the intensity of the charge and field. The droplets are produced continuously, and are directed to the substrate to be printed or, alternatively, to a bypass gutter.

The substrate is typically of paper (coated or uncoated), glass, metal, etc.

Due to the nature of the "continuous" jet printing process, inks used therein must be conductive so as to accept a charge. Such inks are generally water based, as aqueous solutions or dispersions are easily rendered conductive. Water based inks are generally characterized as having a low viscosity (which tends to vary with temperature) and high volatility. Both characteristics can be disadvantageous.

If the viscosity of a jet printing ink is excessively low, misting and the production of stray droplets can result, which in turn result in poor print quality. High volatility of a jet printing ink can result in clogging of jet nozzles owing to evaporation.

So called "drop on demand" (DOD) systems differ from continuous jet printing systems in that ink droplets are expelled from a printing head only when required during the printing process. Since such inks need not be conductive, they have generally been formulated using primarily non-aqueous solvents such as ethylene glycols, particularly diethylene glycols, which are characterized as having low volatility. As such, ethylene glycol based inks do not evaporate quickly and, thus, have reduced clogging problems.

However, ethylene glycol solvents have a relatively high viscosity (which varies significantly with temperature) and thus require relatively more energy for production of droplets. Also, some ethylene glycol inks have to dry by sorption into paper and thus are dependent on paper characteristics.

Ethylene glycol based inks often are mixed with water in order to reduce viscosity or contain water (e.g. 10–15 wt. %) as a result of sorption from air. This can result in clogging problems since the addition of water significantly increases the evaporation rate of the ink. Also, the added water reduces the solubility of many dyes in the solvent system.

Prior water based and ethylene glycol based printing inks exhibited significant variation in viscosity with variation in temperature within the ambient range. This creates significant problems in providing proper pressurization and control for the production of uniformly sized ink droplets. If not controlled, print quality is highly variable.

SUMMARY OF THE INVENTION

It is an object of the invention to overcome one or more of the problems described above.

According to the present invention, a jet printing ink is provided which comprises a coloring agent dissolved or dispersed in a liquid vehicle which consists essentially of one or more propylene glycol ethers or ethylene glycol butyl ethers in which said coloring agent is soluble or dispersible.

The ink composition of the invention can be substantially free of added water, i.e. the only water present may be that which may be sorbed from the atmosphere by the composition, and would generally total no more than about 5–10 wt. % of the composition, and preferably less than about 5 wt. %.

The ink composition of the invention is characterized as having a relatively low volatility and a relatively low viscosity which, however, is not so low as to cause a misting problem or the production of stray dots. In some embodiments of the invention, the viscosity of the ink is remarkably uniform over the range of temperatures to which it is exposed during use. The liquid vehicle of the invention is an excellent solvent for a large variety of soluble dyestuffs.

Other objects and advantages of the invention will be apparent to those skilled in the art from the following detailed description taken in conjunction with the appended claims.

DETAILED DESCRIPTION OF THE INVENTION

Many fluid printing inks, including some jet printing inks, include at least three components. The first is a coloring agent for providing visibility of printed indicia in contrast to the substrate surface. The coloring agent may be either a dye which is soluble in the liquid vehicle (a solvent) or a pigment which is suspended in the liquid vehicle.

A second component of some inks (e.g. printing inks) is a resin or binder which remains on the substrate surface after printing and serves to adhere and bind the dye or pigment in position on the substrate surface. Jet printing inks may not require a binder, or very little.

The third major component is the liquid vehicle which provides fluidity to the ink and carries in solution or suspension the binder (if present) and colorant.

In addition to the foregoing components, various other ingredients may be present, including drying agents, dispersing agents, wetting agents, plasticizers, diluents and the like.

It is to be understood that ink compositions of the invention are similar to prior inks to the extent that a coloring agent and a liquid vehicle, and possibly a binder, are present, and that other consitutents may be present in the formulation as long as they do not detract from the advantageous characteristics thereof.

The ink composition of the invention has the advantage of being able to be substantially water free and to remain so under normal operating conditions.

In addition, the absence of substantial amounts of water tends to improve the solubility of a variety of dyestuffs. In prior ethylene glycol based inks, water is frequently present in relatively great amounts, e.g. at levels of 10–15 wt. % and higher in order to reduce the viscosity of the formulation to manageable levels. The viscosity of the ink formulation of the invention, on the other hand, is well within the desired range of less than 6 cps at 68° F. without the addition of water.

It is unavoidable that some water is sorbed by the ink formulation from the atmosphere but, under most conditions, this will amount to no more than 2–4 wt. %, with no more than about 5 wt. % under normal operating conditions, up to a maximum of about 10 wt. %.

It is highly preferred that the coloring agent of the invention be completely soluble in the liquid vehicle, as pigments dispersed in a suspending agent tend to result in clogging of small orifices of ink jet printing apparatus. However, the invention is not limited to the use of soluble dyestuffs, but can encompass the use of dispersed pigments.

Dyes of the soluble type including, without limitation, Rhodamine, Methyl Violet, Crystal Violet, Chrysoidine, Auramine, Victoria Blue, Dupont Oil Blue, and Oil Scarlet BYS, for example, are suitable for use in the invention.

The dyestuff used can, if desired, be insoluble or have very little solubility in water. Dyes of the so-called basic type (which are generally water soluble) are acceptable, but oil soluble and so-called "solvent soluble" dyes are preferred.

If pigments are used, they should preferably be of the oil dispersible type.

Since the dyestuff may be insoluble or only sparingly soluble in water, the use of a binder may not be necessary, or even desired. An ink of the invention made without a binder will not smear upon contact with water bearing surfaces (e.g. a user's fingers) or upon contact with spilled aqueous liquids (e.g. coffee).

If desired, other additives may be present for purposes recognized in the art.

In accordance with the invention, a liquid vehicle, i.e. solvent or suspending agent, of the ink composition consists essentially of one or more propylene glycol ethers or ethylene glycol butyl ethers in which the coloring agent is soluble or dispersible.

Specific useful liquid vehicles include, without limitation, dipropylene glycol ethers, tripropylene glycol ethers, ethylene glycol butyl ether and diethylene glycol butyl ether.

Propylene glycol alkyl ethers such as dipropylene glycol monomethyl ether and tripropylene glycol monomethyl ether are preferred, with dipropylene glycol monomethyl ether being highly preferred.

Materials which are suitable for use according to the invention are available commercially from several suppliers, including Dow Chemical USA of Midland, Michigan under the trade designation "Dowanol". Tripropylene glycol monomethyl ether is designated "Dowanol TPM". Dipropylene glycol monomethyl ether is available under the designation "Dowanol DPM". Ethylene glycol n-butyl ether is sold under the designation "Dowanol EB", and diethylene glycol n-butyl ether is designated "Dowanol DB". Triethylene glycol n-butyl ether is available as "Dowanol TBH".

Each of the glycol ethers useful in the invention is an excellent solvent for soluble dyestuffs and provides desired ink color depth at relatively low concentrations, thus avoiding clogging problems which are associated with inks which require high dyestuff concentrations. The inks of the invention provide excellent speed of sorption, especially on conventional coated papers which are useful in ink jet applications. The inks have low viscosities so as to minimize energy requirements, yet the viscosities are not so low as to create misting problems or stray dots which seriously degrade print quality.

The concentration of dyestuff in the ink compositions of the invention will vary with desired depth of color and with the dyestuff itself. However, useful dye concentrations are readily empirically determinable by those skilled in the art and in any event generally are in the range of about 2–10 wt. %, preferably 2–5 wt. %.

Although the volatilities of some of the glycol ethers of the invention are slightly higher than the volatility of the diethylene glycol vehicles of the prior art, the volatility of the composition of the invention is acceptably low. Importantly, in addition, the vehicles of the invention have relatively low viscosity, unlike the diethylene glycol vehicles of the prior art which require the addition of water to lower viscosity. Addition of water is disadvantageous in that volatility is increased.

It is especially important in many so-called "drop on demand" ink jet applications that the viscosity of the ink formulation be both low and uniform within the range of ambient temperatures likely to be encountered by the ink during application. These criteria are satisfied by the materials of the invention, in particular by the highly preferred dipropylene glycol monomethyl ether.

The viscosity of dipropylene glycol monomethyl ether varies from 4.4 cps at 68° F. to 2.4 cps at 104° F. This represents a low viscosity which is not so low as to cause unacceptable misting, and the variance in viscosity is so low as to minimize pressurization and control problems which otherwise could result in poor, non-uniform print quality. This viscosity is also comfortably below the maximum desirable viscosity of 5–6 cps at the temperature of use.

The volatilities of the liquid vehicles of the invention are desirably low. For example, Dowanol DPM has a relative evaporation rate of 0.03 (based on an arbitrary evaporation rate of butyl acetate of 1.0). The relative evaporation rate of Dowanol TPM is less than 0.01, and that of Dowanol EB is 0.06. The evaporation rate of Dowanol DB is less than 0.01, while that of Dowanol TBH is much less than 0.01.

The liquid vehicles of the invention are non-mutagenic and non-teratogenic, in contrast to some vehicles of the prior art. In addition to usefulness in ink jet applications, the ink compositions of the invention are useful in felt-tip or rollerball pens especially in applications for overhead viewing apparatus and the like.

The foregoing detailed description is given for clearness of understanding only, and no unnecessary limitations are to be inferred therefrom, as modifications within the scope of the invention will be obvious to those skilled in the art.

I claim:

1. In a method of printing on a substrate wherein droplets of a fluid ink composition are forced through a very small orifice in an ink jet printing head under pressure, the improvement wherein the ink composition comprises a coloring agent dissolved or dispersed in a liquid vehicle consisting essentially of one or more members selected from the group consisting of propylene glycol ethers and ethylene glycol butyl ethers in which said coloring agent is soluble or dispersible.

2. The improvement of claim 1 wherein said coloring agent comprises between about 2 and about 10 wt. %, inclusive, of said ink composition.

3. The improvement of claim 1 wherein said ink composition contains no more than about 5 wt. % water.

4. The improvement of claim 1 wherein said ink composition is substantially non-conductive.

5. The improvement of claim 1 wherein said ether is selected from the group consisting of dipropylene glycol ethers and tripropylene glycol ethers.

6. The improvement of claim 5 wherein said ether is dipropylene glycol monomethyl ether.

7. The improvement of claim 5 wherein said ether is tripropylene glycol monomethyl ether.

8. The improvement of claim 1 wherein said ether is diethylene glycol butyl ether.

9. The improvement of claim 1 wherein said ether is triethylene glycol butyl ether.

10. A jet printing ink composition comprising a coloring agent dissolved in a liquid vehicle consisting essentially of one or more members selected from the group consisting of triethylene glycol monobutyl ether and propylene glycol ethers in which said coloring agent is soluble.

11. The ink composition of claim 10 wherein said coloring agent comprises between about 2 and about 10 wt. %, inclusive, of said ink composition.

12. The ink composition of claim 10 wherein said ink composition contains no more than about 5 wt. % water.

13. The ink composition of claim 10 wherein said ink composition is substantially non-conductive.

14. The ink composition of claim 10 wherein said ether is selected from the group consisting of dipropylene glycol ethers and tripropylene glycol ethers.

15. The ink composition of claim 14 wherein said ether is dipropylene glycol monomethyl ether.

16. The ink composition of claim 14 wherein said ether is tripropylene glycol monomethyl ether.

17. The ink composition of claim 10 wherein said ether is triethylene glycol butyl ether.

18. A jet printing ink composition comprising a liquid vehicle, a coloring agent dissolved in said liquid vehicle, and a binder wherein the liquid vehicle consists essentially of one or more members selected from the group consisting of propylene glycol ethers and ethylene glycol butyl ethers in which said coloring agent is soluble.

19. The ink composition of claim 18 wherein said coloring agent comprises between about 2 and about 10 wt. %, inclusive, of said ink composition.

20. The ink composition of claim 18 wherein said ink composition contains no more than about 5 wt. % water.

21. The ink composition of claim 18 wherein said ink composition is substantially non-conductive.

22. The ink composition of claim 18 wherein said ether is selected from the group consisting of dipropylene glycol ethers and tripropylene glycol ethers.

23. The ink composition of claim 22 wherein said ether is dipropylene glycol monomethyl ether.

24. The ink composition of claim 22 wherein said ether is tripropylene glycol monomethyl ether.

25. The ink composition of claim 18 wherein said ether is diethylene glycol butyl ether.

26. The ink composition of claim 18 wherein said ether is triethylene glycol butyl ether.

27. A jet printing ink composition which is essentially non-conductive, said composition comprising a liquid vehicle, a coloring agent dissolved in said liquid vehicle, and a binder wherein said liquid vehicle consists essentially of one or more members selected from the group consisting of propylene glycol ethers and ethylene glycol butyl ethers in which said coloring agent is soluble.

28. The ink composition of claim 27 wherein said coloring agent comprises between about 2 and about 10 wt. %, inclusive, of said ink composition.

29. The ink composition of claim 27 wherein said ink composition contains no more than about 5 wt. % water.

30. The ink composition of claim 27 wherein said ether is selected from the group consisting of dipropylene glycol ethers and tripropylene glycol ethers.

31. The ink composition of claim 30 wherein said ether is dipropylene glycol monomethyl ether.

32. The ink composition of claim 30 wherein said ether is tripropylene glycol monomethyl ether.

33. The ink composition of claim 27 wherein said ether is diethylene glycol butyl ether.

34. The ink composition of claim 27 wherein said ether is triethylene glycol butyl ether.

35. In a jet printing ink composition comprising a liquid vehicle, a coloring agent dispersed in said liquid vehicle and optionally a binder, the improvement wherein the liquid vehicle consists essentially of one or more members selected from the group consisting of propylene glycol ethers and ethylene glycol butyl ethers in which said coloring agent is dispersible.

36. The improvement of claim 35 wherein said coloring agent comprises between about 2 and about 10 wt. %, inclusive, of said ink composition.

37. The improvement of claim 35 wherein said ink composition contains no more than about 5 wt. % water.

38. The improvement of claim 35 wherein said ink composition is substantially non-conductive.

39. The improvement of claim 35 wherein said ether is selected from the group consisting of dipropylene glycol ethers and tripropylene glycol ethers.

40. The improvement of claim 39 wherein said ether is dipropylene glycol monomethyl ether.

41. The improvement of claim 39 wherein said ether is tripropylene glycol monomethyl ether.

42. The improvement of claim 35 wherein said ether is diethylene glycol butyl ether.

43. The improvement of claim 35 wherein said ether is triethylene glycol butyl ether.

44. In a jet printing ink composition comprising a liquid vehicle, a coloring agent dispersed in said liquid vehicle and optionally a binder, the improvement wherein the liquid vehicle consists essentially of one or more members selected from the group consisting of propylene glycol ethers and ethylene glycol butyl ethers in which said coloring agent is dispersible, said ink composition being substantially free of petroleum wax and polyethylene wax.

45. The improvement of claim 44 wherein said coloring agent comprises between about 2 and about 10 wt. %, inclusive, of said ink composition.

46. The improvement of claim 44 wherein said ink composition contains no more than about 5 wt. % water.

47. The improvement of claim 44 wherein said ink composition is substantially non-conductive.

48. The improvement of claim 44 wherein said ether is selected from the group consisting of dipropylene glycol ethers and tripropylene glycol ethers.

49. The improvement of claim 48 wherein said ether is dipropylene glycol monomethyl ether.

50. The improvement of claim 48 wherein said ether is tripropylene glycol monomethyl ether.

51. The improvement of claim 44 wherein said ether is diethylene glycol butyl ether.

52. The improvement of claim 44 wherein said ether is triethylene glycol butyl ether.

53. The improvement of claim 1 wherein the droplets are expelled from the ink jet printing head only when required during the printing process.

* * * * *